(12) United States Patent
Lei et al.

(10) Patent No.: US 11,907,498 B2
(45) Date of Patent: Feb. 20, 2024

(54) HUMAN-COMPUTER INTERACTION METHOD, APPARATUS AND SYSTEM AND COMPUTER-READABLE STORAGE MEDIUM

(71) Applicant: BOE TECHNOLOGY GROUP CO., LTD., Beijing (CN)

(72) Inventors: Liping Lei, Beijing (CN); Changcheng Liu, Beijing (CN); Yangyang Zhang, Beijing (CN); Honglei Zhang, Beijing (CN); Yongda Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 189 days.

(21) Appl. No.: 17/428,412

(22) PCT Filed: Oct. 30, 2020

(86) PCT No.: PCT/CN2020/125126
§ 371 (c)(1),
(2) Date: Aug. 4, 2021

(87) PCT Pub. No.: WO2022/088011
PCT Pub. Date: May 5, 2022

(65) Prior Publication Data
US 2022/0350462 A1 Nov. 3, 2022

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/0488* (2013.01); *G06F 3/04845* (2013.01); *G06F 2203/04806* (2013.01)

(58) Field of Classification Search
None
See application file for complete search history.

(56) References Cited

U.S. PATENT DOCUMENTS

| 5,325,110 A | 6/1994 | Tang et al. |
| 2007/0176904 A1* | 8/2007 | Russo ............... G06F 3/0488 345/173 |

(Continued)

FOREIGN PATENT DOCUMENTS

| CN | 104484121 A | 4/2015 |
| CN | 105183349 A | 12/2015 |

(Continued)

OTHER PUBLICATIONS

McKinnon, "How to Create Photoshop Custom Brushes," Apr. 17, 2017, https://astropad.com/how-to-create-custom-brushes/.*
(Continued)

*Primary Examiner* — Ryan Barrett
(74) *Attorney, Agent, or Firm* — The Webb Law Firm

(57) ABSTRACT

The present disclosure relates to a human-computer interaction method, apparatus, and system, and a computer-readable storage medium. The human-computer interaction method includes: displaying an eraser icon on a touch display screen according to a first touch operation of a user; adjusting at least one of a direction, a size or a shape of the eraser icon according to a second touch operation of the user, wherein the second touch operation includes at least one of a rotation operation or a deformation operation on the eraser icon; and performing an erase operation on an area to be erased according to the adjusted eraser icon.

18 Claims, 7 Drawing Sheets

(51) Int. Cl.
  *G06F 3/04845* (2022.01)
  *G06F 3/0488* (2022.01)

(56) References Cited

U.S. PATENT DOCUMENTS

| | | | | |
|---|---|---|---|---|
| 2011/0078597 | A1* | 3/2011 | Rapp | G06F 3/04845 345/173 |
| 2012/0206344 | A1* | 8/2012 | Hill | G06F 3/0488 345/157 |
| 2012/0293425 | A1* | 11/2012 | Lee | G06F 3/0488 345/173 |
| 2012/0302167 | A1* | 11/2012 | Yun | G06F 16/951 345/169 |
| 2014/0281866 | A1* | 9/2014 | Kishimoto | G06F 40/166 715/211 |
| 2015/0309720 | A1* | 10/2015 | Fisher | G06F 3/04842 715/752 |
| 2016/0054879 | A1* | 2/2016 | Chiu | G06F 3/04883 715/769 |
| 2016/0239128 | A1* | 8/2016 | Zhang | G06F 3/015 |
| 2016/0275702 | A1* | 9/2016 | Reynolds | G06F 3/04842 |
| 2016/0320870 | A1* | 11/2016 | Bell | G06F 3/0482 |
| 2016/0321238 | A1* | 11/2016 | Kurita | G06F 3/04883 |
| 2017/0090692 | A1* | 3/2017 | Kurita | G06F 40/166 |
| 2018/0121076 | A1* | 5/2018 | Hamada | G06F 3/0484 |

FOREIGN PATENT DOCUMENTS

| | | |
|---|---|---|
| CN | 106775286 A | 5/2017 |
| CN | 107380988 A | 11/2017 |
| CN | 110162242 A | 8/2019 |
| CN | 111625158 A | 9/2020 |
| JP | 3180850 B2 | 6/2001 |
| JP | 2018163684 A | 10/2018 |

OTHER PUBLICATIONS

He et al., "Why Take Notes? Use the Whiteboard Capture System,", Microsoft Research Technical Report, Sep. 2002, Microsoft Corporation.

Zuo, "Design and Key Techniques Research of Interactive Electronic Whiteboard Software", Mar. 2, 2013.

* cited by examiner

HUMAN-COMPUTER INTERACTION METHOD, APPARATUS AND SYSTEM AND COMPUTER-READABLE STORAGE MEDIUM

CROSS-REFERENCE TO RELATED APPLICATION

This application is the United States national phase of International Application No. PCT/CN2020/125126 filed Oct. 30, 2020, the disclosure of which is hereby incorporated by reference in its entirety.

TECHNICAL FIELD

The present disclosure relates to the field of computer technologies, and in particular, to a human-computer interaction method, apparatus, and system, and a computer-readable storage medium.

BACKGROUND

An electronic whiteboard is a digital teaching demonstration device for replacing traditional blackboard and chalks. The electronic whiteboard can be free from a mouse and a keyboard, and perform operations such as edit, annotation and save, on electronic documents, by using a finger or a specific pen, thereby bringing great convenience to a user.

In a process of writing or drawing on the electronic whiteboard, the user often needs to perform an erase operation on a specific area. In the related art, rectangular or circular erasers of different sizes are displayed on the electronic whiteboard, and the user selects a corresponding eraser as needed, and uses the selected eraser to perform the erase operation on an area to be erased on the electronic whiteboard. For example, in the light of a size and a shape of the area to be erased, it is possible to select a larger or smaller eraser, or a rectangular or circular eraser.

SUMMARY

According to some embodiments of the present disclosure, there is provided a human-computer interaction method, comprising:

displaying an eraser icon on a touch display screen according to a first touch operation of a user;

adjusting at least one of a direction, a size or a shape of the eraser icon according to a second touch operation of the user, wherein the second touch operation comprises at least one of a rotation operation or a deformation operation on the eraser icon; and performing an erase operation on an area to be erased according to the adjusted eraser icon.

In some embodiments, the deformation operation comprises at least one of a local dragging operation of changing an outline of the eraser icon, or a zooming operation of changing the shape of the eraser icon.

In some embodiments, the second touch operation further comprises at least one of a zooming operation on the eraser icon, a translation operation on the eraser icon, or a zooming operation on the area to be erased.

In some embodiments, the human-computer interaction method further comprises: adding a control section to the eraser icon according to a third touch operation of the user, wherein the control section is used for performing the erase operation on the area to be erased according to the adjusted eraser, and is moved in synchronization with the eraser icon when the erase operation is performed.

In some embodiments, the eraser icon comprises a plurality of different shapes including at least one of a polygon, a circle, or an ellipse.

In some embodiments, the eraser icon is polygonal, and the second touch operation further comprises a local zooming operation of changing one or more interior angles of the polygonal eraser icon.

In some embodiments, the adjusting at least one of the direction, the size or the shape of the eraser icon according to the eraser icon and the second touch operation of the user comprises: determining the size of the eraser icon according to a contact area of the user with the touch display screen.

In some embodiments, the first touch operation comprises: a selection operation of clicking a menu bar, touching a designated area on the touch display screen, touching the touch display screen for a first predetermined time, making an erase gesture on the touch display screen, or drawing the eraser icon on the touch display screen.

In some embodiments, that displaying an eraser icon on a touch display screen according to a first touch operation of a user comprises:

displaying eraser icons of a plurality of different shapes on the touch display screen according to the first touch operation of the user; and in response to a selection of the user, displaying a selected eraser icon on the touch display screen.

In some embodiments, the displaying eraser icons of a plurality of different shapes on the touch display screen according to the first touch operation of the user comprises: sequentially arranging the eraser icons of the plurality of different shapes in a strip, a ring or a partial ring.

In some embodiments, the second touch operation further comprises an operation of enabling the eraser icon to be in an editable state.

In some embodiments, the operation of enabling the eraser icon to be in an editable state comprises: in the case that the touch display screen is long pressed to display a state of the eraser icon, touching another area on the touch display screen except an area where the eraser icon is displayed.

According to other embodiments of the present disclosure, there is provided a human-computer interaction apparatus comprising:

a memory; and a processor coupled to the memory, wherein the processor is configured to perform, based on instructions stored in the memory, one or more steps of the human-computer interaction method of any of the foregoing embodiments.

According to still other embodiments of the present disclosure, there is provided a human-computer interaction system, comprising:

the human-computer interaction apparatus of the foregoing embodiments; and a touch display screen.

According to other embodiments of the present disclosure, there is provided a computer-readable storage medium having thereon stored a computer program which, when executed by a processor, implements one or more steps of the human-computer interaction method of any of the foregoing embodiments.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which constitute a part of the specification, illustrate embodiments of this disclosure and, together with this specification, serve to explain the principles of this disclosure.

The present disclosure may be more clearly understood from the following detailed description in conjunction with the accompanying drawings, in which.

It should be understood that sizes of various parts shown in the accompanying drawings are not drawn to actual scales. Further, identical or similar reference numerals denote identical or similar components.

DETAILED DESCRIPTION

Various exemplary embodiments of the present disclosure will now be described in detail with reference to the accompanying drawings. The description of the exemplary embodiments is merely illustrative and is in no way intended to limit the present disclosure, its application, or uses. The present disclosure may be implemented in many different forms and is not limited to the embodiments described herein. These embodiments are provided to make this disclosure thorough and complete, and fully convey the scope of the present disclosure to those skilled in the art. It should be noted that: the relative arrangement of components and steps set forth in these embodiments should be construed to be merely illustrative instead of restrictive unless specifically stated otherwise.

All terms (including technical or scientific terms) used herein have the same meanings as those understood by one of ordinary skill in the art to which this disclosure belongs unless specifically defined otherwise. It will be further understood that terms defined in, for example, common dictionaries, should be interpreted as having meanings consistent with their meanings in the context of the related art and will not be interpreted with idealized or extremely formalized meanings unless expressly defined herein.

Techniques, methods, and devices known by one of ordinary skill in the related art may not be discussed in detail, but are intended to be regarded as a part of the specification where appropriate.

In the related art, a user can only select a rectangular or circular eraser of different sizes according to a size and a shape of an area to be erased in a process of writing or drawing on an electronic whiteboard. However, once the eraser is selected, it cannot be adjusted to match the area to be erased before an erase operation is performed, and particularly when the area to be erased is irregular in shape, it is inconvenient for the user to quickly and conveniently erase the area to be erased of different shapes and sizes.

In view of this, embodiments of the present disclosure provide a human-computer interaction method capable of improving the erase convenience for the user and meeting the requirements of multiple scenarios.

Figure 1A:
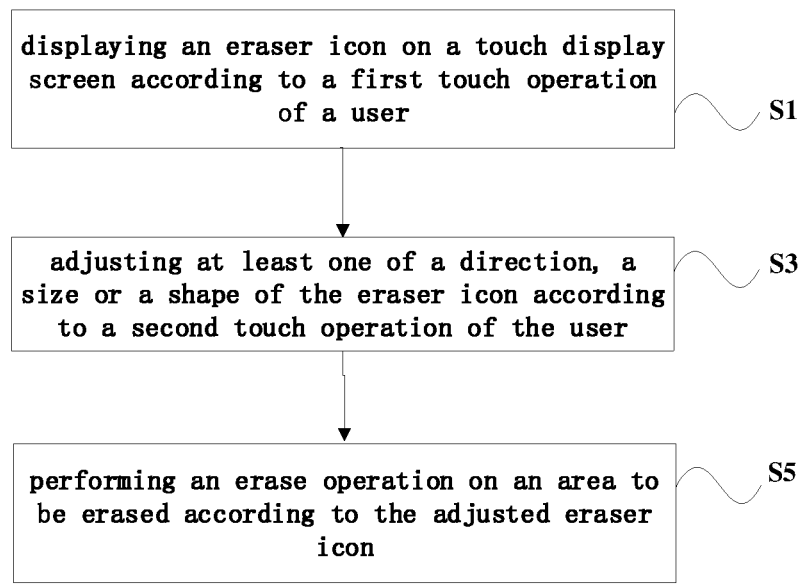
FIG. 1A is a flow diagram illustrating a human-computer interaction method according to an embodiment of the present disclosure.

FIG. 1A is a flow diagram illustrating a human-computer interaction method according to an embodiment of the present disclosure.

As shown in FIG. 1A, the human-computer interaction method comprises: step S1, displaying an eraser icon on a touch display screen according to a first touch operation of a user; step S3, adjusting at least one of a direction, a size or a shape of the eraser icon according to a second touch operation of the user; and step S5, performing an erase operation on an area to be erased according to the adjusted eraser icon.

The human-computer interaction method can be used for intelligent interaction equipment such as electronic whiteboards, meeting machines, educational machines and smart screens. A writing or whiteboard application based on the above human-computer interaction method, which is executed by a processor and displayed on the touch display screen and interacted with a user, can be used in scenarios such as meeting and teaching scenarios. The touch display screen is, for example, an infrared, electromagnetic, or capacitive type of touch display screen. The writing application can run on a system such as Android, windows.

After the writing application is activated, a canvas is displayed on the touch display screen. Writing operations such as writing and drawing can be performed on the canvas by the user. The touch display screen recognizes track points written by the user and feeds them back to a back-end processor, and the back-end processor processes the track points to recognize various touch operations (also called gesture operations), for example, screen single-clicking is recognized as performing the writing operation, and screen double-clicking is recognized as dragging the canvas.

In the step S1, the first touch operation comprises: a selection operation of clicking a menu bar, touching a designated area on the touch display screen, touching the touch display screen for a first predetermined time, making an erase gesture on the touch display screen, or drawing the eraser icon on the touch display screen. By establishing a correspondence between gestures and functions of the first touch operation, the processor is enabled to display a corresponding eraser icon in response to a gesture recognition result without a conflict with an existing gesture.

In some embodiments, that displaying an eraser icon on a touch display screen according to a first touch operation of a user comprises: displaying eraser icons of a plurality of different shapes on the touch display screen according to the first touch operation of the user; and in response to a selection of the user, displaying a selected eraser icon on the touch display screen. That is, the displaying an eraser icon on a touch display screen according to a first touch operation of a user comprises not only displaying the eraser icon for the selection of the user, but also displaying the eraser icon selected by the user.

For example, the selection operation of clicking the menu bar can be a single-clicking or multi-clicking selection operation. When the user touches the designated area (e.g., border) on the touch display screen, the eraser function can be enabled, e.g., displaying the eraser icons of a plurality of different shapes on the touch display screen. The eraser function can also be enabled according to long contact between the user's finger and the touch display screen (e.g., long press for 5 seconds). The eraser function can also be enabled according to an erase gesture of the user on the touch display screen. For example, the eraser function is enabled when the user touches the touch display screen with a palm or back of a hand. The eraser function being enabled herein comprises displaying the eraser icons for the selection of the user.

In some embodiments, the first touch operation of drawing the eraser icon on the touch display screen can be worked with other operations, to realize the function of displaying the eraser icon on the touch display screen. For example, a menu option can be displayed through a touch operation on the touch display screen, and the eraser function can be enabled according to the selection of an eraser option in the menu option, wherein the menu option may further comprises other operations such as writing.

The eraser icon comprises a plurality of different shapes, for example, at least one of a polygon, a circle, an ellipse, etc. The polygon includes a planar graph formed by three or more line segments connected end to end in sequence, e.g., triangle, rectangle, diamond, and trapezoid.

Figure 2A:
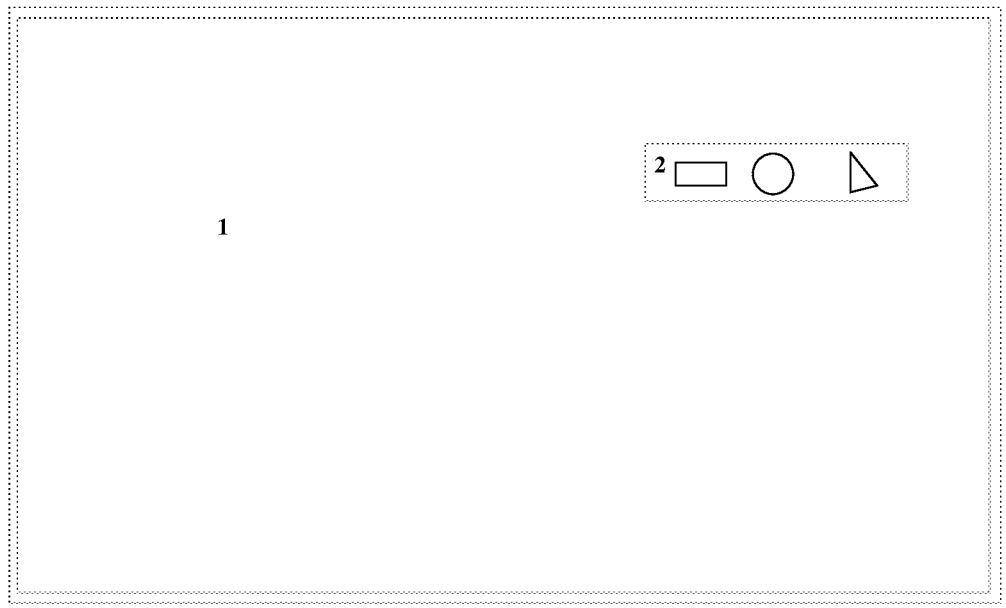
FIG. 2A shows a schematic diagram of displaying eraser icons of a plurality of different shapes on a touch display screen according to some embodiments of the present disclosure.

FIG. 2A shows a schematic diagram of displaying eraser icons of a plurality of different shapes on a touch display screen according to some embodiments of the present disclosure. As shown in FIG. 2A, for example, according to a long-press gesture or erase gesture of the user, on the touch display screen 1 are shown three common eraser icons 2, which are respectively rectangular, circular and triangular.

In some embodiments, as shown in FIG. 2A, the eraser icons of the plurality of different shapes are sequentially arranged in a strip. Of course, the eraser icons of the plurality of different shapes can be sequentially arranged in a ring or a partial ring.

In some embodiments, after the selected eraser icon is displayed on the touch display screen, other eraser icons except the selected eraser icon are continuously displayed in a floating manner. In other embodiments, after the selected eraser icon is displayed on the touch display screen fora second predetermined time, the other eraser icons are hidden.

It should be appreciated that the eraser icon can be displayed in any area of the touch display screen. However, in order to more conveniently adjust the direction, size, or shape of the eraser icon to match the area to be erased, the eraser icon can be displayed in the area to be erased.

Figure 2B:
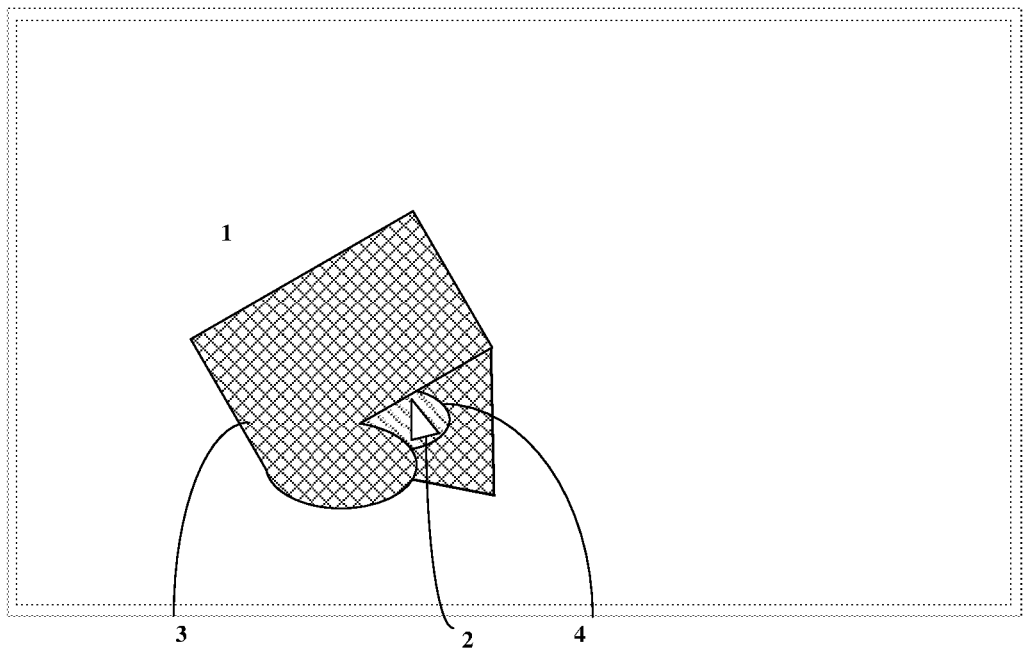
FIG. 2B shows a schematic diagram of displaying a triangular eraser icon on a touch display screen according to some embodiments of the present disclosure.

FIG. 2B illustrates a schematic diagram of displaying a triangular eraser icon on a touch display screen according to some embodiments of the present disclosure. As shown in FIG. 2B, according to the user's selection of the triangular eraser icon, for example, a triangular eraser icon 2 is displayed in an area to be erased 4 of a drawing area 3.

In the step S3, the second touch operation comprises at least one of a rotation operation or a deformation operation on the eraser icon. The direction of the eraser icon can be changed by using the rotation operation, the size of the eraser icon can be changed by using a zooming operation, and the shape of the eraser icon can be changed by using the deformation operation. In some embodiments, the size of the eraser icon can be determined according to a contact area of the user with the touch display screen. For example, the size of the eraser icon can be changed according to a change in the contact area between the user's hand and the touch display screen.

In the case that the eraser icon is polygonal, the second touch operation further comprises a local zooming operation of changing one or more interior angles of the polygonal eraser icon.

The second touch operation can further comprise an operation of enabling the eraser icon to be in an editable state. The operation of enabling the eraser icon to be in an editable state can comprise: in the case that the touch display screen is long pressed to display a state of the eraser icon, touching another area on the touch display screen except the area where the eraser icon is displayed.

In some embodiments, the eraser can be activated after continuous clicking select operations are performed; when the user touches the display screen to display the eraser, the position where the eraser is displayed is the same as the position where the finger touches the display screen; in a touch state where the eraser is kept displayed, touching another area can enable the eraser icon to be in an editable state, for example, adjusting the eraser; and then, the adjusted eraser is moved to the area to be erased, and the content can be erased.

That touching another area on the touch display screen except the area where the eraser icon is displayed can comprise: tapping any area except the area where the eraser icon is displayed. The tapping herein can be performed one or more times. That touching another area on the touch display screen except the area where the eraser icon is displayed can further comprise: long pressing (e.g., 6 seconds) any area except the area where the eraser icon is displayed.

Figure 2C:
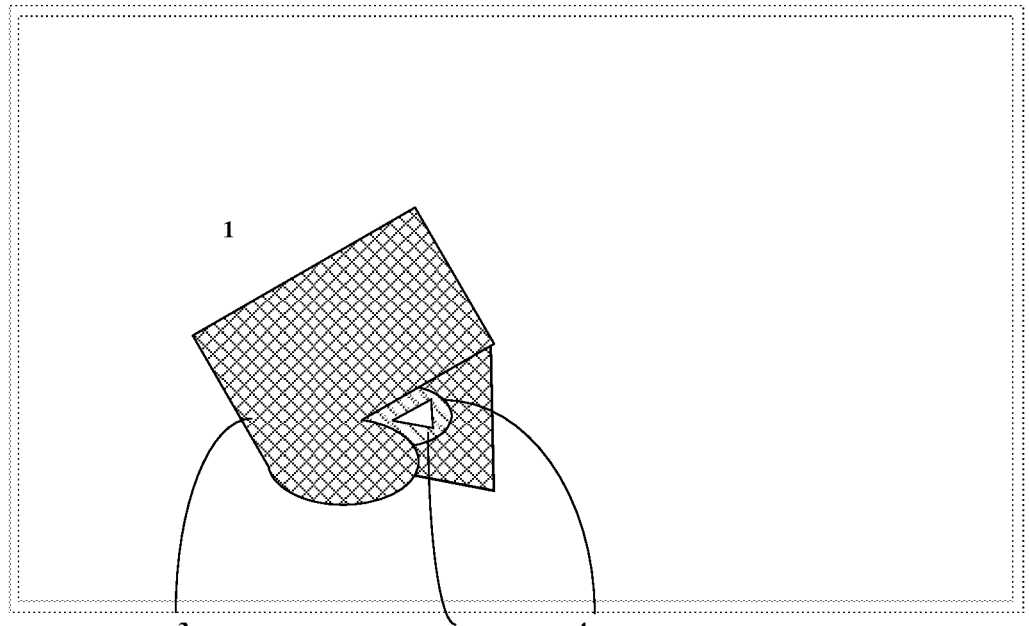
FIG. 2C shows a schematic diagram of having performed a rotation operation on the eraser icon of FIG. 2B.

FIG. 2C shows having performed a rotation operation on the eraser icon of FIG. 2B. As shown in FIG. 2C, the triangular eraser icon 2 is rotated by a certain angle (e.g., 80 degrees) according to the rotation gesture of the user, to be matched with a pointed angle area (i.e., left side) of the area 4 to be erased. In some embodiments, the (rotated) eraser icon can also be zoomed and translated to more conveniently perform the erase operation.

Figure 2D:
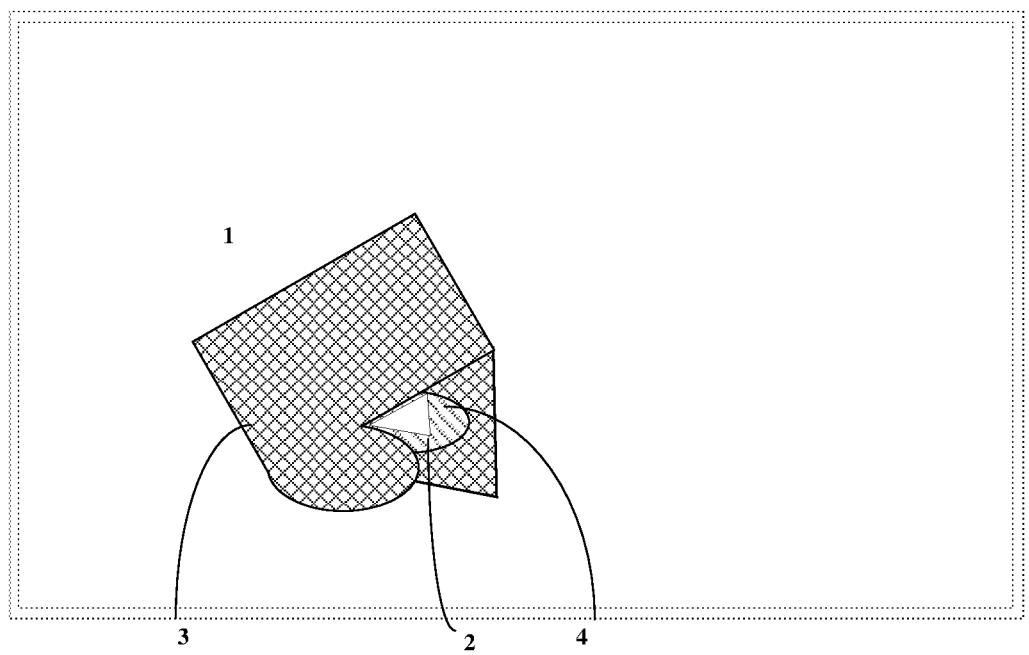
FIG. 2D shows a schematic diagram of having performed a zooming operation on the eraser icon of FIG. 2C.

FIG. 2D shows having performed a zooming operation on the eraser icon of FIG. 2C. As shown in FIG. 2D, the selected triangular eraser icon 2, after being zoomed-in (e.g., zoomed-in 1.5 times in equal proportion), is more closely matched with the pointed angle area of the area to be erased 4. In some embodiments, a size of a vertex angle in the triangular eraser icon 2 corresponding to the pointed angle area of the area to be erased 4 can also be changed by performing a local zooming operation.

As can be seen from FIG. 2D, for the pointed angle area of the area to be erased 4, it is easy to realize erase by using the triangular eraser, while for an arc area (i.e., right side) of the area to be erased 4, it is easier for erase by using an elliptical eraser.

Figure 2E:
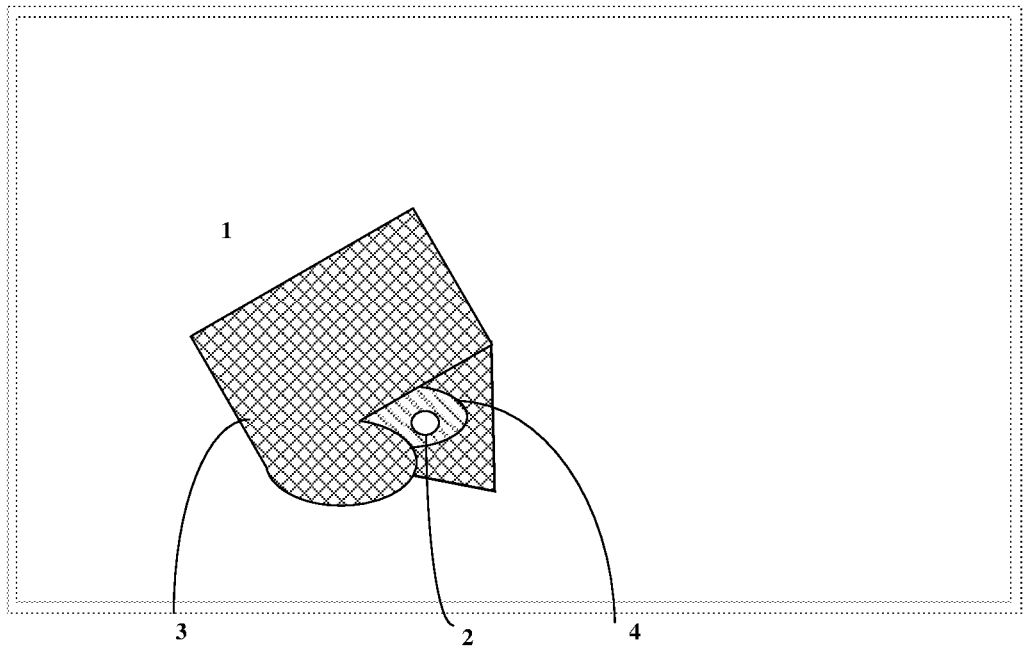
FIG. 2E shows a schematic diagram of displaying a circular eraser icon on a touch display screen according to some embodiments of the present disclosure.

FIG. 2E shows a schematic diagram of displaying a circular eraser icon in an area to be erased on a touch display screen according to some embodiments of the present disclosure. As shown in FIG. 2E, according to a touch operation of the user selecting a circular eraser, for example, the circular eraser icon 2 is displayed in the area to be erased 4 of the drawing area 3.

As can be seen from FIG. 2E, the circular eraser cannot be well matched with the area to be erased. In order to perform the erase operation more conveniently, the deformation operation can be performed on the eraser icon. In some embodiments, the deformation operation comprises at least one of a local dragging operation of changing an outline of the eraser icon, or a zooming operation of changing the shape of the eraser icon.

Figure 2F:
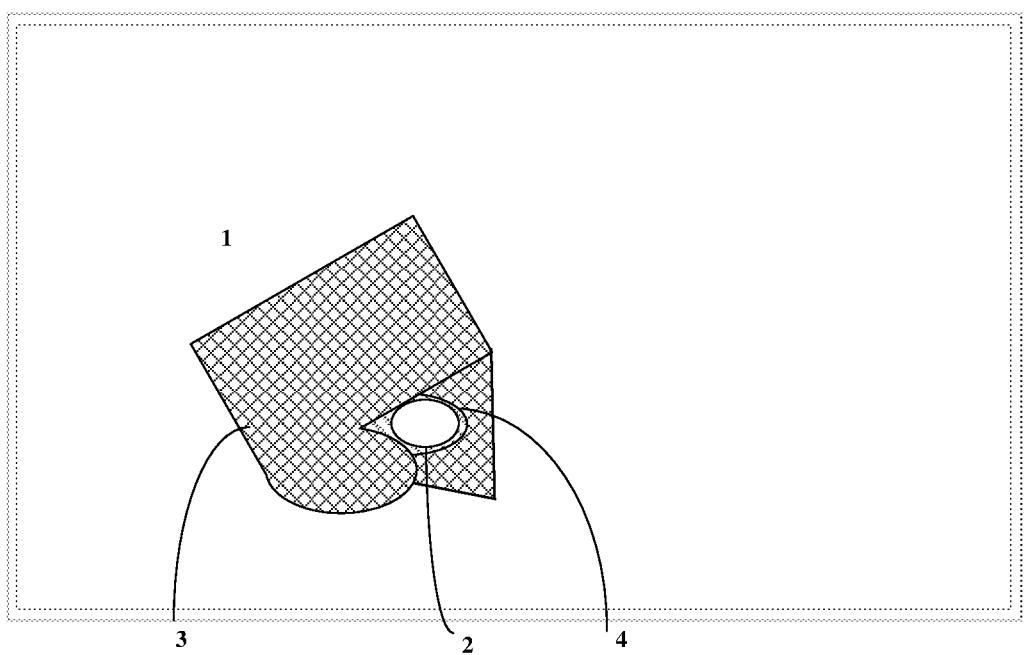
FIG. 2F shows a schematic diagram of having performed a deformation operation on the eraser icon of FIG. 2E.

FIG. 2F shows having performed a deformation operation on the eraser icon of FIG. 2E. As shown in FIG. 2E, the circular eraser icon 2, after subjected to the deformation operation (e.g., a zooming-in operation not in equal proportion), is more closely matched with the arc area of the area to be erased 4. In some embodiments, the local dragging operation can be performed on the zoomed eraser icon above, to change the outline of the eraser icon to better fit the outline of the area to be erased.

In some embodiments, in order to perform the erase operation more conveniently, the zooming operation (e.g., zooming-in operation) can be also performed on the area to be erased according to the second touch operation, so as to more easily realize the erase under precise control.

Figure 1B:
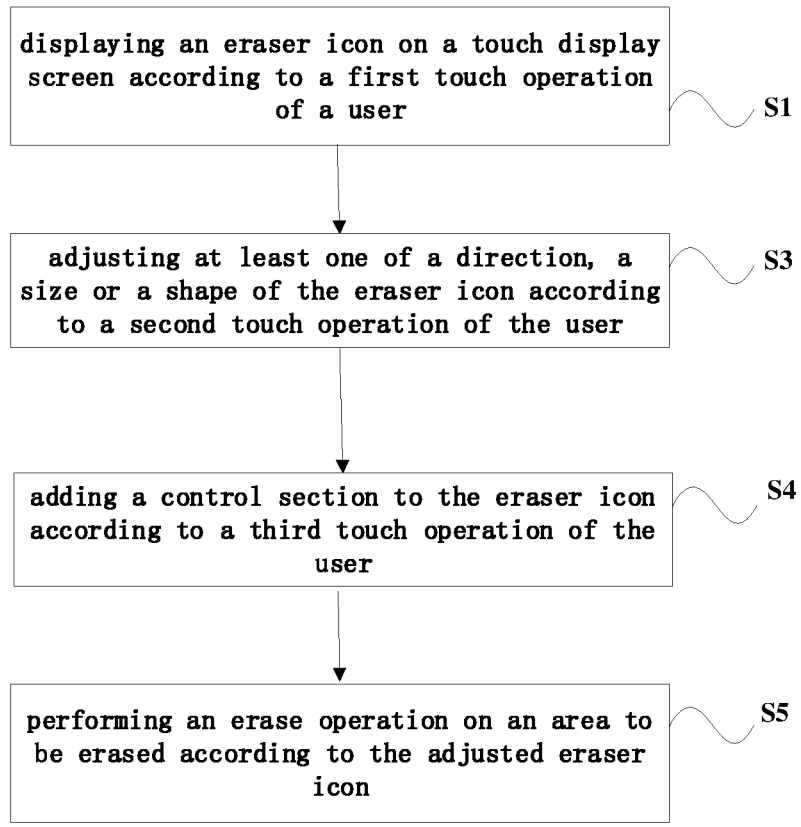
FIG. 1B is a flow diagram illustrating a human-computer interaction method according to another embodiment of the present disclosure.

FIG. 1B is a flow diagram illustrating a human-computer interaction method according to another embodiment of the present disclosure. FIG. 1B is different from FIG. 1A in that it further includes step S4. Only the differences between FIG. 1B and FIG. 1A will be described below, and the same parts will not be described again.

As shown in FIG. 1B, in step S4, a control section, e.g., a handle, is added to the eraser icon according to a third touch operation of the user. The control section is moved in synchronization with the eraser icon when the erase operation is performed, i.e., for the erase operation, the control section is linked with the eraser icon. The control section has no erase function. The third touch operation can further comprise the operation of enabling the eraser icon in an editable state, similar to the second touch operation. When the eraser icon is in the editable state, the control section can be added to the eraser icon, for example, a graph of the control section is drawn. That is, the third touch operation can further comprise an operation of drawing the control section.

By using the control section, the erase operation is performed on the area to be erased according to the adjusted eraser. In this way, other areas in the drawing area except the area to be erased can be prevented from being erased in the erase process, which is more convenient for the operation of the user.

Figure 2G:
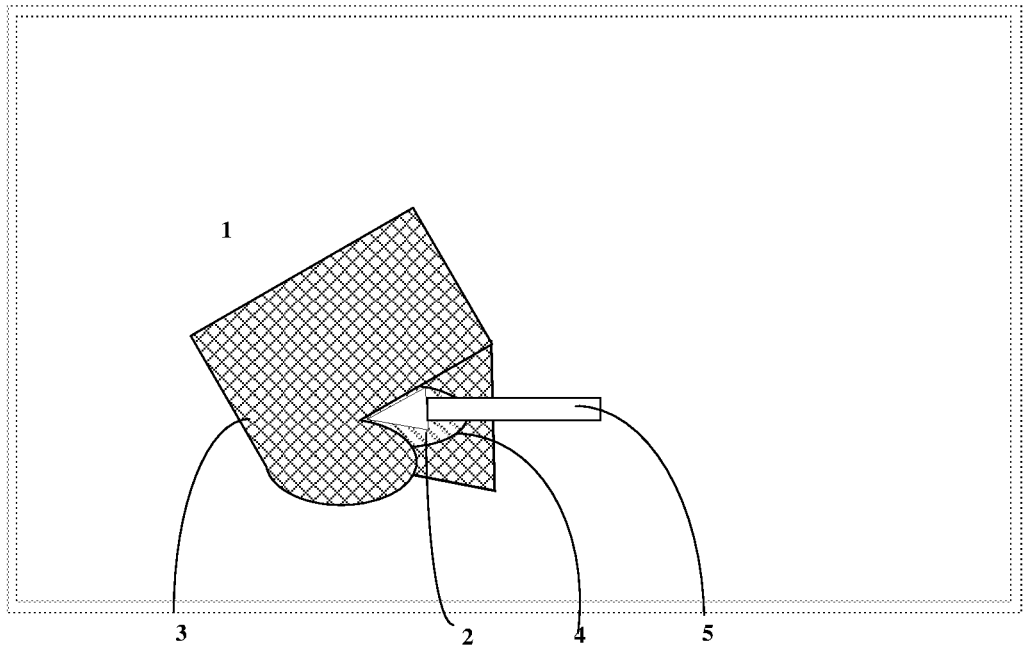
FIG. 2G shows a schematic diagram of having added a handle to the eraser icon of FIG. 2D.

FIG. 2G shows having added a control section to the eraser icon of FIG. 2D. As shown in FIG. 2G, the triangular eraser icon 2, after a control section 5 is added thereto, is more convenient for the operation of the user. The user can perform the erase operation by using the control section.

In the step S5, the erase operation is performed on the area to be erased according to the adjusted eraser icon. For example, by using the adjusted triangular eraser icon or the adjusted elliptical eraser icon described above, the erase operation is performed on the area to be erased.

Figure 3:
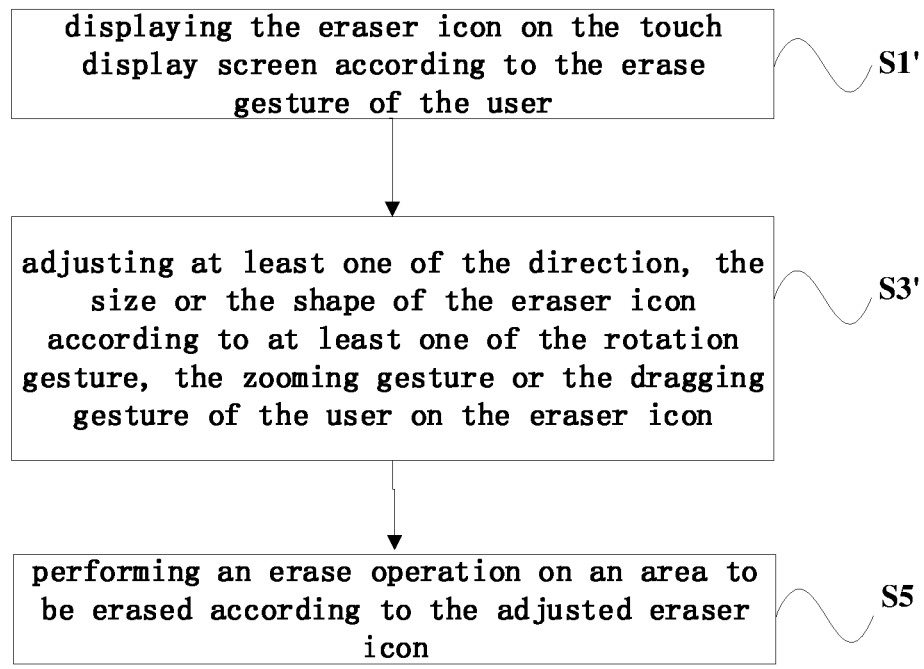
FIG. 3 is a flow diagram illustrating a human-computer interaction method according to yet another embodiment of the present disclosure.

FIG. 3 is a flow diagram illustrating a human-computer interaction method according to yet another embodiment of the present disclosure. FIG. 3 is different from FIG. 1 in that steps S1' and S3' in FIG. 3 correspond to the steps S1 and S3 in FIG. 1, respectively, and provide specific implementations for the first touch operation and the second touch operation in FIG. 1, respectively. Only the differences between FIG. 3 and FIG. 1 will be described below, and the description of the same step S5 will not be repeated.

In step S1', the eraser icon is displayed on the touch display screen according to the erase gesture of the user. The eraser icons of the plurality of different shapes can be displayed on the touch display screen according to the erase gesture of the user, and then the selected eraser icon is displayed according to the selection of the user.

In step S3', at least one of the direction, the size or the shape of the eraser icon is adjusted according to at least one of the rotation gesture, or the zooming gesture and the dragging gesture of the user on the eraser icon. As described above, the direction of the eraser icon can be changed according to the rotation gesture. The size of the eraser icon or the size of the area to be erased can also be changed according to the zooming gesture. The zooming herein can be in equal proportion or not in equal proportion. The zooming gesture not in equal proportion can also change the shape of the eraser icon, for example, from a circle to an ellipse, a vertex angle of an isosceles triangle from 50 degrees to 60 degrees. The shape of the eraser icon can also be changed according to the local dragging gesture on the outline of the eraser icon.

As described above, in some embodiments, in order to prevent other areas in the drawing area except the area to be erased from being erased in the erase process, the control section can be added to the eraser icon to facilitate the operation. The control section is moved in synchronization with the eraser icon when the erase operation is performed, but the control section has no erase function.

Thus far, various method embodiments of the present disclosure have been described in detail, and corresponding product embodiments will be described below. The embodiment of the present disclosure also provides a human-computer interaction apparatus.

Figure 4A:
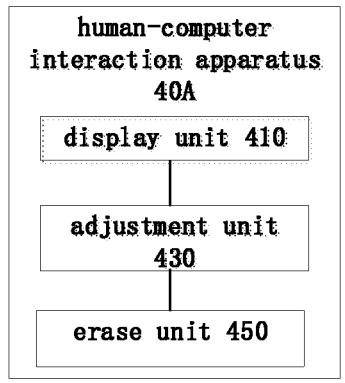
FIG. 4A is a block diagram illustrating a human-computer interaction apparatus according to an embodiment of the present disclosure.

FIG. 4A is a block diagram illustrating a human-computer interaction apparatus according to an embodiment of the present disclosure.

As shown in FIG. 4A, the human-computer interaction apparatus 40A comprises a display unit 410, an adjustment unit 430, and an erase unit 450.

The display unit 410 is configured to display an eraser icon on a touch display screen according to a first touch operation of a user, for example, to perform the step S1.

As described above, the first touch operation comprises: a selection operation of clicking a menu bar, touching a designated area on the touch display screen, touching the touch display screen for a first predetermined time, making an erase gesture on the touch display screen, or drawing an eraser icon in an area to be erased.

The adjustment unit 430 is configured to adjust at least one of a direction, a size, or a shape of the eraser icon according to a second touch operation of the user, for example, to perform the step S3.

As described above, the second touch operation can comprise at least one of a rotation operation, a deformation operation, a translation operation, and a zooming operation on the eraser icon, or a zooming operation on the area to be erased. In the case that the eraser icon is polygonal, the second touch operation further comprises a local zooming operation of changing one or more interior angles of the polygonal eraser icon. In some embodiments, the second touch operation further comprises an operation of adding a control section to the eraser icon, wherein the control section is moved in synchronization with the eraser icon when the erase operation is performed, but the control section has no erase function. In other embodiments, the size of the eraser icon can be determined according to a contact area of the user with the touch display screen.

The erase unit 450 is configured to perform an erase operation on the area to be erased according to the adjusted eraser icon, for example, to perform the step S5.

Figure 4B:
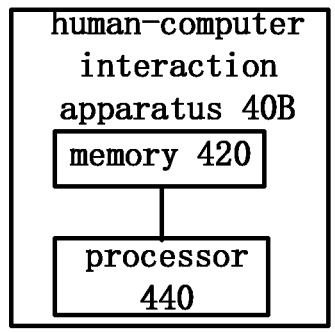
FIG. 4B is a block diagram illustrating a human-computer interaction apparatus according to another embodiment of the present disclosure.

FIG. 4B is a block diagram illustrating a human-computer interaction apparatus according to another embodiment of the present disclosure.

As shown in FIG. 4B, the human-computer interaction apparatus 40B comprises: a memory 420 and a processor 440 coupled to the memory 440. The memory 420 is configured to store instructions for performing corresponding embodiments of the human-computer interaction method. The processor 440 is configured to perform, based on the instructions stored in the memory 420, one or more steps of the human-computer interaction method in any of the embodiments of the present disclosure.

It should be understood that one or more of the steps of the foregoing human-computer interaction method can be implemented by a processor, and can be implemented by means of software, hardware, firmware, or any combination thereof.

In addition to the human-computer interaction method, apparatus, and system, the embodiments of the present disclosure can also take a form of a computer program product implemented on one or more non-volatile storage media containing computer program instructions. Accordingly, the embodiments of the present disclosure also provide a computer-readable storage medium having thereon stored computer instructions which, when executed by a processor, implement one or more steps of the human-computer interaction method in any of the foregoing embodiments.

Figure 5:
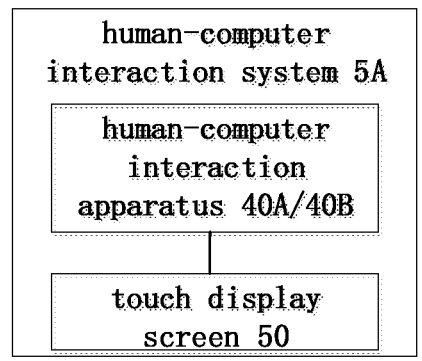
FIG. 5 is a block diagram illustrating a human-computer interaction system according to an embodiment of the present disclosure.

As shown in FIG. 5, the human-computer interaction system 5A comprises: a touch display screen 50; and the foregoing human-computer interaction apparatus 40A or 40B.

Figure 6:
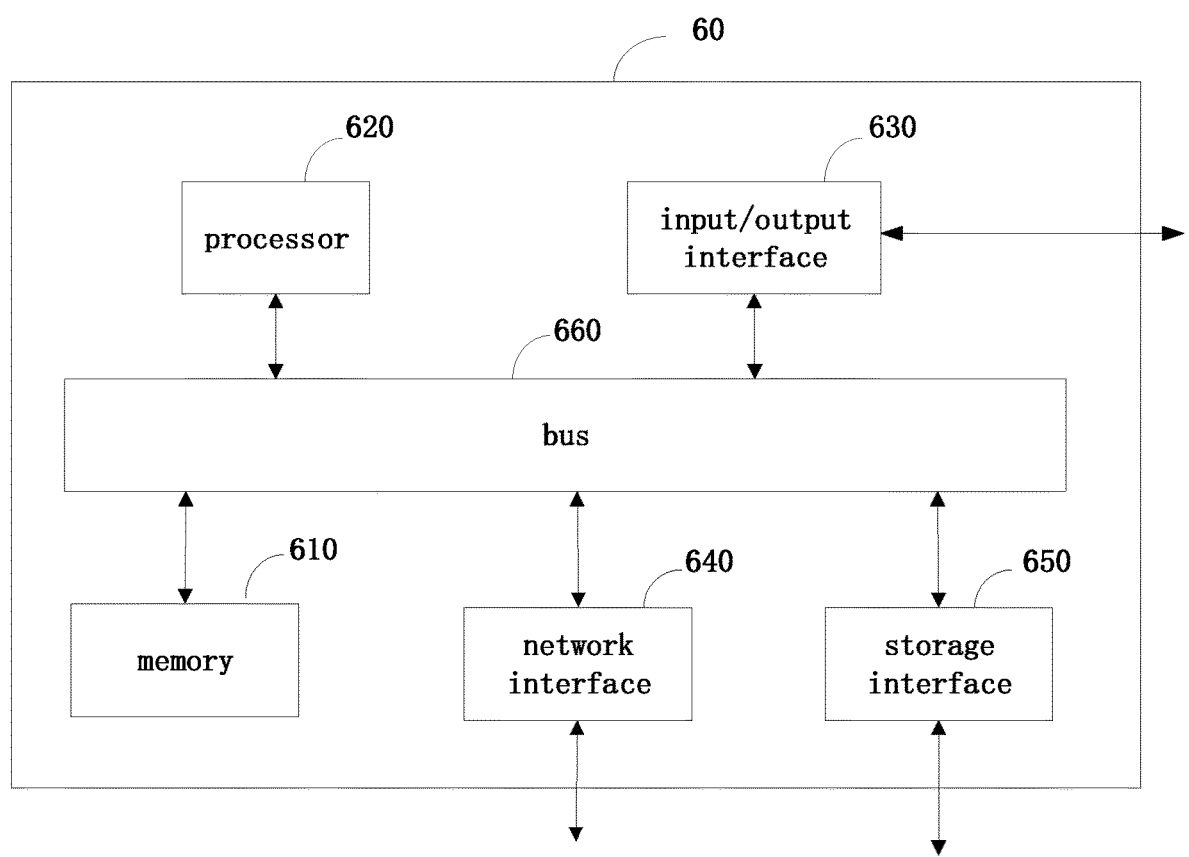
FIG. 6 is a block diagram illustrating a computer system for implementing some embodiments of the present disclosure.

FIG. 6 is a block diagram illustrating a computer system for implementing some embodiments of the present disclosure.

As shown in FIG. 6, the computer system can be shown in the form of a general-purpose computing device, which can be used to implement the human-computer interaction apparatus of the above embodiments. The computer system comprises a memory 610, a processor 620, and a bus 600 connecting different system components.

The memory 610 can include, for example, a system memory, a non-volatile storage medium, etc. The system memory has thereon stored, for example, an operating system, an application program, a Boot Loader, and other programs, etc. The system memory can include a volatile storage medium, such as a Random Access Memory (RAM) and/or cache memory. The non-volatile storage medium has thereon stored, for example, instructions to perform the corresponding embodiments of the display method. The non-volatile storage medium includes, but is not limited to, a magnetic disk memory, optical memory, flash memory, etc.

The processor 620 can be implemented by a general purpose processor, Digital Signal Processors (DSP), Application Specific Integrated Circuits (ASIC), Field Programmable Gate Arrays (FPGA) or other programmable logic device, a discrete hardware component such as discrete gate or transistor, etc. Accordingly, each device, such as the judgment device and the determination device, can be implemented by a Central Processing Unit (CPU) running instructions in a memory to perform the corresponding steps, or can be implemented by a dedicated circuit performing the corresponding steps.

Any of bus architectures can be used for the bus 600. For example, the bus architectures include, but are not limited to, an Industry Standard Architecture (ISA) bus, Micro Channel Architecture (MCA) bus, and Peripheral Component Interconnect (PCI) bus.

The computer system can also comprise an input/output interface 630, a network interface 640, a storage interface 650, and the like. These interfaces 630, 640, 650 and the memory 610 and the processor 620 can be connected by the bus 600. The input/output interface 630 can provide connection interfaces for input/output devices such as display, mouse, and keyboard. The network interface 640 provides connection interfaces for a variety of networking devices. The storage interface 640 provides connection interfaces for external storage devices such as floppy disk, USB disk, and SD card.

Thus far, various embodiments of the present disclosure have been described in detail. Some details well known in the art have not been described in order to avoid obscuring the concept of the present disclosure. Those skilled in the art can now fully appreciate how to implement the technical solutions disclosed herein, in view of the foregoing description.

Although some specific embodiments of the present disclosure have been described in detail by way of example, it should be understood by those skilled in the art that the above examples are for illustration only and are not intended to limit the scope of the present disclosure. It will be understood by those skilled in the art that modifications to the above embodiments or equivalent substitutions for parts of the technical features can be made without departing from the scope and spirit of the present disclosure. The scope of the present disclosure is defined by the appended claims.

What is claimed is:

1. A human-computer interaction method, comprising:
displaying an eraser icon on a touch display screen according to a first touch operation of a user;
adjusting at least one of a direction, a size or a shape of the eraser icon according to a second touch operation of the user, wherein the second touch operation comprises at least one of a rotation operation or a deformation operation on the eraser icon, wherein the second touch operation further comprises an operation of enabling the eraser icon to be in an editable state, comprising: in case that the touch display screen is long pressed to keep displaying the eraser icon, touching another area on the touch display screen except an area where the eraser icon is displayed to enable the eraser icon to be in the editable state; and
performing an erase operation on an area to be erased according to the adjusted eraser icon.

2. The human-computer interaction method according to claim 1, wherein the deformation operation comprises at least one of a local dragging operation of changing an outline of the eraser icon, or a zooming operation of changing the shape of the eraser icon.

3. The human-computer interaction method according to claim 1, wherein the second touch operation further comprises at least one of a zooming operation on the eraser icon, a translation operation on the eraser icon, or a zooming operation on the area to be erased.

4. The human-computer interaction method according to claim 1, further comprising:
adding a control section to the eraser icon according to a third touch operation of the user, wherein the control section is used for performing the erase operation on the area to be erased according to the adjusted eraser, and is moved in synchronization with the eraser icon when the erase operation is performed.

5. The human-computer interaction method according to claim 1, wherein the eraser icon comprises a plurality of different shapes including at least one of a polygon, a circle, or an ellipse.

6. The human-computer interaction method according to claim 1, wherein the adjusting at least one of the direction, the size or the shape of the eraser icon according to the eraser icon and the second touch operation of the user comprises:
determining the size of the eraser icon according to a contact area of the user with the touch display screen.

7. The human-computer interaction method according to claim 1, wherein the first touch operation comprises:
a selection operation of clicking a menu bar, touching a designated area on the touch display screen, touching the touch display screen for a first predetermined time, making an erase gesture on the touch display screen, or drawing the eraser icon on the touch display screen.

8. The human-computer interaction method according to claim 1, wherein the displaying an eraser icon on a touch display screen according to a first touch operation of a user comprises:
displaying eraser icons of a plurality of different shapes on the touch display screen according to the first touch operation of the user; and
in response to a selection of the user, displaying a selected eraser icon on the touch display screen.

9. The human-computer interaction method according to claim 8, wherein the displaying eraser icons of a plurality of different shapes on the touch display screen according to the first touch operation of the user comprises:
sequentially arranging the eraser icons of the plurality of different shapes in a strip, a ring or a partial ring.

10. The human-computer interaction method according to claim 1, wherein the local zooming operation further comprises changing the size of one of the interior angles of the polygonal eraser icon to match a pointed angle area of the area to be erased.

11. The human-computer interaction method according to claim 1, wherein the eraser icon is polygonal, and the second touch operation further comprises a local zooming operation of changing one or more interior angles of the polygonal eraser icon.

12. A human-computer interaction apparatus comprising:
a memory; and
a processor coupled to the memory, wherein the processor is configured to perform, based on instructions stored in the memory, one or more steps of a human-computer interaction method comprising:
displaying an eraser icon on a touch display screen according to a first touch operation of a user;
adjusting at least one of a direction, a size or a shape of the eraser icon according to a second touch operation of the user, wherein the second touch operation comprises at least one of a rotation operation or a deformation operation on the eraser icon, wherein the second touch operation further comprises an operation of enabling the eraser icon to be in an editable state, comprising: in case that the touch display screen is long pressed to keep displaying the eraser icon, touching another area on the touch display screen except an area where the eraser icon is displayed to enable the eraser icon to be in the editable state; and
performing an erase operation on an area to be erased according to the adjusted eraser icon.

13. A human-computer interaction system, comprising:
the human-computer interaction apparatus according to claim 12; and
a touch display screen.

14. The human-computer interaction apparatus according to claim 12, wherein the deformation operation comprises at least one of a local dragging operation of changing an outline of the eraser icon, or a zooming operation of changing the shape of the eraser icon.

15. The human-computer interaction apparatus according to claim 12, wherein the second touch operation further comprises at least one of a zooming operation on the eraser icon, a translation operation on the eraser icon, or a zooming operation on the area to be erased.

16. The human-computer interaction apparatus according to claim 12, wherein the processor is further configured to add a control section to the eraser icon according to a third touch operation of the user, wherein the control section is used for performing the erase operation on the area to be erased according to the adjusted eraser, and is moved in synchronization with the eraser icon when the erase operation is performed.

17. The human-computer interaction apparatus according to claim 12, wherein the eraser icon comprises a plurality of different shapes including at least one of a polygon, a circle, or an ellipse.

18. A non-transitory computer-readable storage medium having thereon stored a computer program which, when executed by a processor, implements one or more steps of a human-computer interaction method comprising:
displaying an eraser icon on a touch display screen according to a first touch operation of a user;
adjusting at least one of a direction, a size or a shape of the eraser icon according to a second touch operation of the user, wherein the second touch operation comprises at least one of a rotation operation or a deformation operation on the eraser icon, wherein the second touch operation further comprises an operation of enabling the eraser icon to be in an editable state, comprising: in case that the touch display screen is long pressed to keep displaying the eraser icon, touching another area on the touch display screen except an area where the eraser icon is displayed to enable the eraser icon to be in the editable state; and
performing an erase operation on an area to be erased according to the adjusted eraser icon.

* * * * *